United States Patent
Burroughs et al.

(10) Patent No.: US 6,691,190 B1
(45) Date of Patent: Feb. 10, 2004

(54) INTER-DSP DATA EXCHANGE IN A MULTIPLE DSP ENVIRONMENT

(75) Inventors: William G. Burroughs, Macungie, PA (US); Steven J. Pollock, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/490,434

(22) Filed: Jan. 24, 2000

(51) Int. Cl.[7] .............................................. G06F 13/00
(52) U.S. Cl. .......................... 710/100; 710/305; 710/52
(58) Field of Search .................................. 710/100, 260, 710/266, 267, 56, 52, 4, 264, 1, 33, 305–306; 709/310, 200, 201, 209, 212, 215

(56) References Cited

U.S. PATENT DOCUMENTS

| | | | | |
|---|---|---|---|---|
| 4,543,627 A | * | 9/1985 | Schwab | 709/212 |
| 5,509,127 A | * | 4/1996 | Datwyler et al. | 710/311 |
| 6,009,389 A | * | 12/1999 | Dokic et al. | |
| 6,026,448 A | * | 2/2000 | Goldrian et al. | 709/212 |
| 6,145,007 A | * | 11/2000 | Dokic et al. | |
| 6,289,403 B1 | * | 9/2001 | Fodor | 710/52 |
| 6,338,095 B1 | * | 1/2002 | Yasuda et al. | 709/250 |
| 6,385,704 B1 | * | 5/2002 | Rao et al. | |
| 6,477,607 B1 | * | 11/2002 | Jeong | 710/305 |
| 2001/0037441 A1 | * | 11/2001 | Rosin et al. | 712/34 |

* cited by examiner

Primary Examiner—Mark H. Rinehart
Assistant Examiner—Kim T. Huynh (57) ABSTRACT

An inter-processor data exchange system is provided in a multiple processor environment. The system includes a first message unit and a second message unit. The first message unit stores first data from a first processor and transfers the stored first data to the second message unit. The second message unit stores the first data from the first message unit and responsively provides the first data to a second processor. The second message unit also stores second data from the second processor and transfers the stored second data to the first message unit, and the first message unit stores the second data from the second message unit and responsively provides the second data to the first processor. Each message unit also provides an interrupt signal to the other processor for informing the other processor that the data is available for reading. In addition, each message unit provides a first flag signal for informing its own processor that the other processor has read the data.

28 Claims, 4 Drawing Sheets

INTER-DSP DATA EXCHANGE IN A MULTIPLE DSP ENVIRONMENT

FIELD OF THE INVENTION

The present invention relates generally to digital signal processors (DSPS) and, more particularly, to data communications between one DSP and other DSPs.

BACKGROUND OF THE INVENTION

Advances in very large scale integration have contributed to the current digital signal processors (DSPs). These processors are special purpose microprocessors characterized by architectures and instructions suitable for digital signal processing applications. DSPs are utilized in a number of applications from communications and controls to speech and image processing. Special purpose DSPs, designed for a specific signal processing application such as for fast fourier transform (FFT) have also emerged.

One such DSP, for example the TMS320C30, supports fixed- and floating-point operations. Features of this processor include 32 bit by 32 bit floating-point multiply operations in one instruction cycle time of 60 nsec. Since a number of instructions, such as load and store, multiply and add, can be performed in parallel in one cycle time, the TMS320C30 can execute a pair of instructions in 30 nsec, allowing for 33.3 MIPS. The TMS320C30 has 2K words of on-chip memory and 16 million words of addressable memory spaces for program, data and input/output. Specialized instructions are available to make common DSP algorithms, such as filtering and spectral analysis, execute fast and efficiently. Like other microprocessors, the DSP may take advantage of higher level languages, such as C and ADA.

In a system having multiple independent DSPs, it is often necessary to send data from one DSP to another DSP, and for one DSP to inform or signal another DSP that the data is ready. Also, after the DSP has read the data provided from the other DSP, it must signal the other DSP that the data has been read. This ensures that new data is not provided prior to the DSP having had an opportunity to read the old data.

Figure 1:
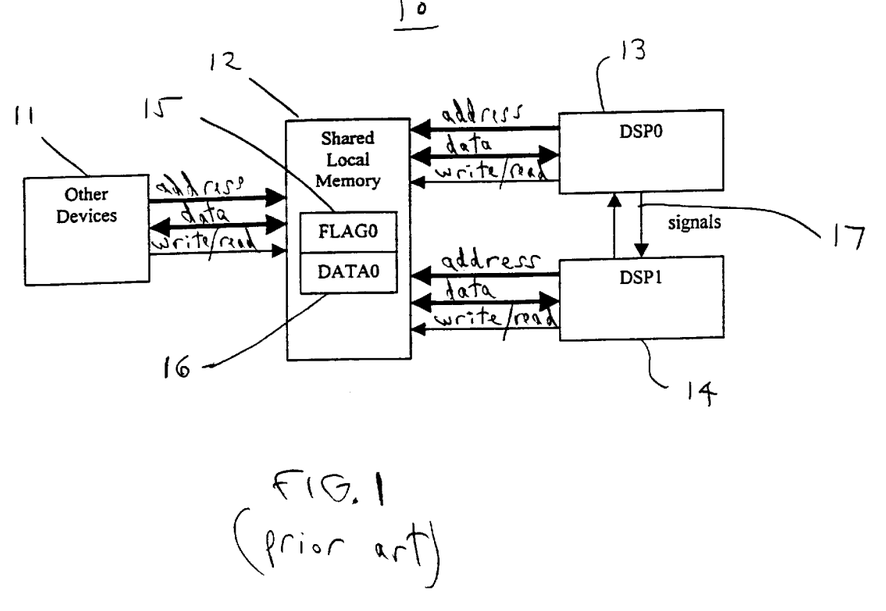
FIG. 1 is a block diagram illustrating a conventional system of exchanging data from one DSP to another DSP.

A conventional method of exchanging data between a source DSP and a destination DSP involves using a shared external or internal memory that each DSP may access to pass the data. An interrupt signal or flag is also provided to signal the destination DSP that the data is available. A conventional system for exchanging data between two DSPs is shown in FIG. 1. Conventional system 10 includes DSP$\phi$ and DSP1, respectively designated 13 and 14, sharing local memory 12. Other devices 11 also share local memory 12. Each device, for example DSP$\phi$, writes to or reads data from local memory 12 by way of its data bus, and by placing the address of local memory 12 on its address bus. A write/read command determines whether the data is sent to the local memory from DSP$\phi$ or data is received from the local memory by DSP$\phi$.

In operation, the source DSP, for example DSP$\phi$, desires to send data to the destination DSP, for example DSP1. Before the data is sent, source DSP$\phi$ reads a flag from FLAG$\phi$ (designated 15) located in shared memory 12 to ensure that it is not overwriting a previous data word placed in location DATA$\phi$ (designated 16). If the previous data word has already been read, DSP$\phi$ writes the data to DATA$\phi$ and writes a new flag value to FLAG$\phi$. DSP$\phi$ then signals DSP1, by way of an interrupt (for example interrupt signal 17). The interrupt informs DSP1 that the data is available.

Next in sequence, DSP1 reads the data from the shared memory and writes a new flag value to FLAG$\phi$.

Disadvantages associated with system 10 include large latency periods incurred when accessing an external, shared resource. If other devices are also permitted to access the shared resource, bandwidth of the shared resource is reduced. Exchanging data through a shared memory requires additional code, the code tending to become complex. Additional operations tie up the shared resource and prevent other devices from using the resource.

A need exists, therefore, to provide a system for exchanging data between processors that does not require use of a shared resource or memory.

SUMMARY OF THE INVENTION

To meet this and other needs, and in view of its purposes, the present invention provides an apparatus and method for exchanging data between two independent processors. In a multiple processor environment that has first and second processors, the invention includes a first message unit and a second message unit. The first message unit is coupled between the first processor and the second message unit, and the second message unit is coupled to the second processor. The first message unit stores first data from the first processor and transfers the stored first data to the second message unit. The second message unit stores the first data from the first message unit and responsively provides the first data to the second processor. The second message unit also stores second data from the second processor and transfers the stored second data to the first message unit, and the first message unit stores the second data from the second message unit and responsively provides the second data to the first processor.

The first message unit also provides a first interrupt signal to the second processor for informing the second processor that the first data is available for reading, and the second message unit provides a second interrupt signal to the first processor for informing the first processor that the second data is available for reading. In addition, the first message unit provides a first flag signal for informing the first processor that the second processor has read the first data, and the second message unit provides a second flag signal for informing the second processor that the first processor has read the second data.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention relates to communications between DSP cores that exist on the same physical chip and implemented as blocks on the chip, or as separate standalone devices implemented as discrete components on a board. The present invention, although described for DSP applications, also relates to any other type of processor, such as a general purpose microprocessor or a microcontroller, for example.

Figure 2:
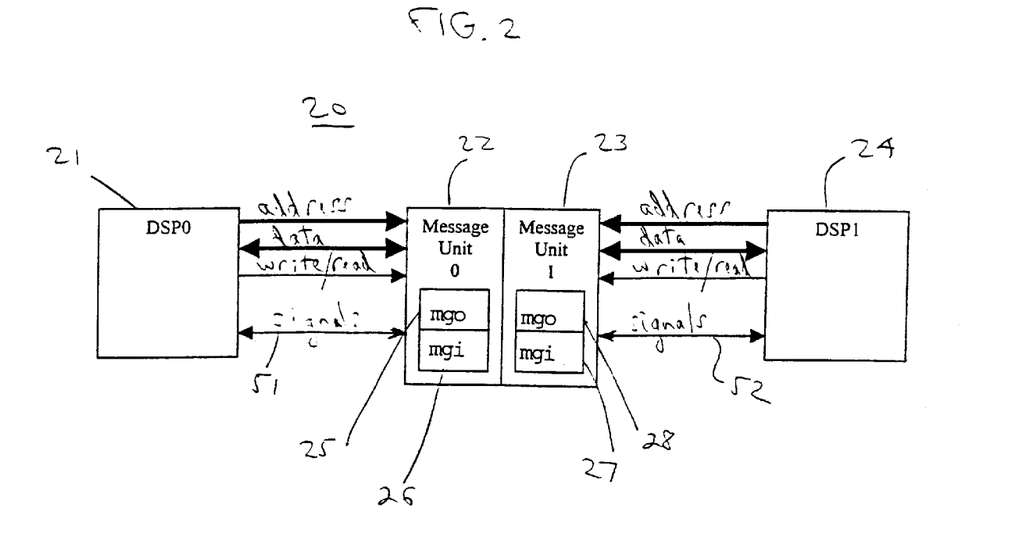
FIG. 2 is a block diagram illustrating an exemplary embodiment of an inter-DSP data exchange system in accordance with the present invention.

Referring to FIG. 2, there is shown an embodiment of the present invention. As shown, inter-DSP data exchange system 20 includes DSPφ and DSP1, respectively designated as 21 and 24. Each DSP includes its own message unit. DSPφ has message unit φ, generally designated as 22, and DSP1 has message unit 1, generally designated as 23. As will be explained, each message unit includes a pair of two registers, referred to herein as message output buffer (mgo) and message input buffer (mgi). Message unit φ includes mgo 25 and mgi 26, whereas message unit 1 includes mgo 28 and mgi 27.

Each pair of registers is external to the DSP and capable of being mapped into the DSP's address space. By addressing the message unit with a predetermined address on the address bus, data may be written to or read from the message unit by way of the data bus. The write/read command enables data to be written to or obtained from the message unit, in a manner similar to writing or reading data from any other register accessible by the DSP. As will be explained, logic for setting and resetting flags and interrupts is included in each message unit. The flags and interrupts are provided from message unit φ to DSPφ by way of signal lines 51, whereas the flags and interrupts from message unit 1 to DSP1 are provided by way of signal lines 52, as shown.

Figure 3:
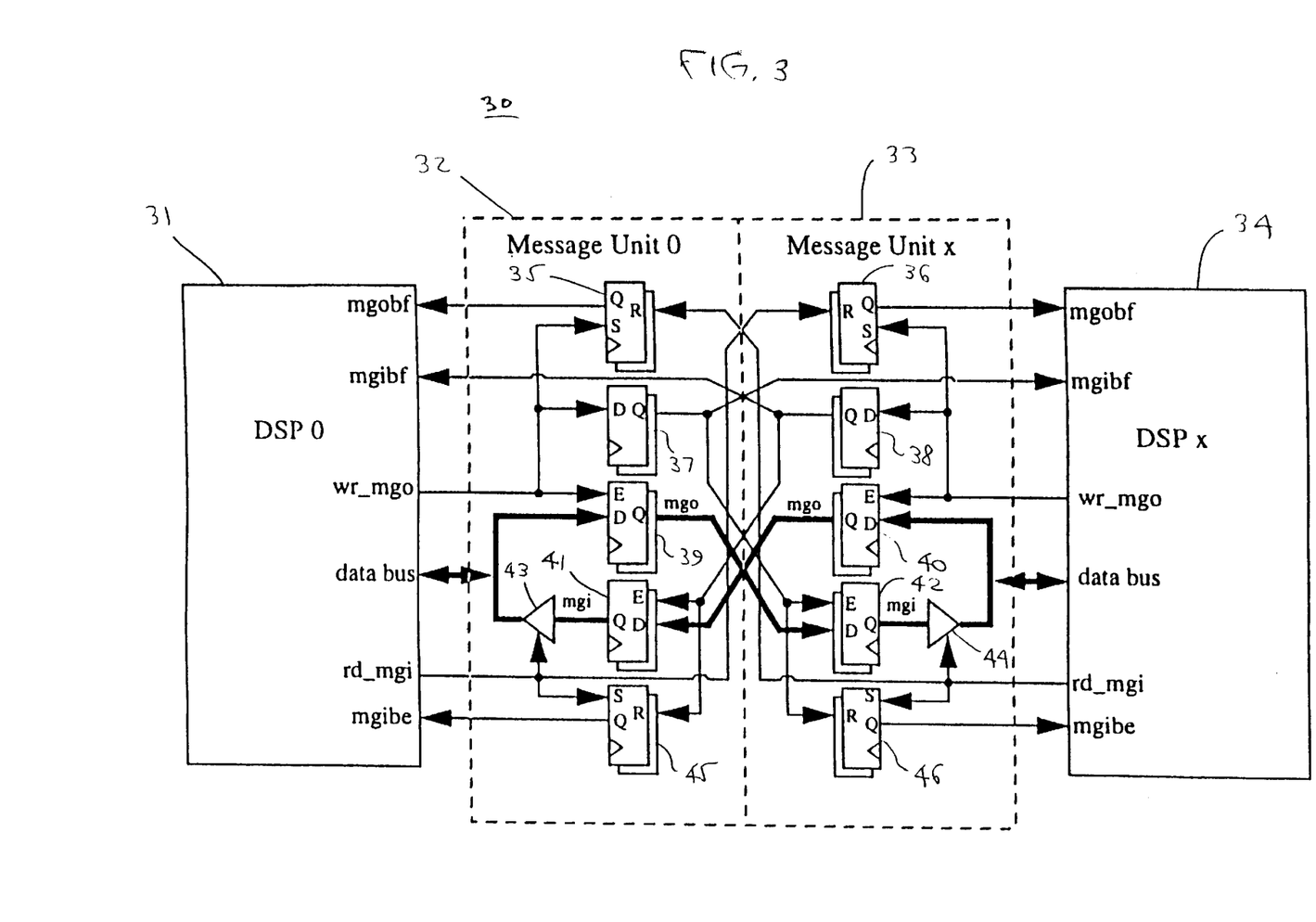
FIG. 3 is a block diagram illustrating another exemplary embodiment of an inter-DSP data exchange system in accordance with the present invention.

FIG. 3 illustrates another embodiment of an inter-DSP data exchange system 30. System 30 includes multiple DSPs, with each DSP having its own message unit. Only two DSPs are shown in the figure. DSPφ (designated as 31) addresses and writes/reads data to/from message unit φ (designated as 32). Similarly, DSP x (designated as 34) addresses and writes/reads data to/from message unit x (designated as 33).

A data word (for example, 16 bits of parallel data) is written to message output buffer (mgo) 39 by way of a data bus connecting DSPφ and the D-terminals of mgo 39. Mgo 39 is enabled by a write command sent from the wr_mgo terminal of DSPφ to the E-terminals of mgo 39. The data word, after having been written into mgo 39, is output from the register by way of the Q-terminals of mgo 39. It will be appreciated that mgo 39 is a register having a set of flip/flops. For example, if mgo 39 is a 16 bit register, then mgo 39 includes 16 flip/flops.

Referring next to message input buffer (mgi) 41, a data word is read from mgi 41 by DSPφ, by way of the data bus connected, through buffer 43, to the Q-terminals of mgi 41. Buffer 43 is enabled by a read command sent from the rd_mgi terminal of DSPφ. As shown, data is placed into mgi 41 by mgo 40 of message unit x (designated as 33). Message unit x places the data into mgi 41, through the D-terminals of mgi 41, after enabling mgi 41 at its E-terminals. Mgi 41 is a register having a set of flip/flops similar to mgo 39.

Also shown in FIG. 3 are flip/flops 35, 37 and 45, each participating in the functioning of message unit φ. As will be explained, these flip/flops provide signaling functions, including interrupts to DSP x, and flags to its own processor, DSPφ.

When DSPφ provides a write command to mgo 39, it also provides the same command to flip/flops 37 and 35. On the first clock cycle (not shown) the write command is provided as an input signal to the D-terminal of flip/flop 37. On the next clock cycle, the Q-terminal of flip/flop 37 is enabled to provide an mgi buffer full interrupt to DSP x. The interrupt is provided to the mgi buffer full (mgibf) interrupt terminal of DSP x. This interrupt informs DSP x that a data word has been sent to mgi 42 from mgo 39. DSP x may now read the data from its own register, mgi 42.

While the write command enables writing of data to mgo 39, the write command also enables the S-terminal of flip/flop 35, and sets the Q-output terminal of flip/flop 35 to provide a mgo buffer full (mgobf) flag to DSPφ. By providing the mgobf flag, DSPφ is informed that its own register, mgo 39, is full, and new data is not to be written into mgo 39 before the mgo buffer full flag is reset by flip/flop 35. The mgo buffer full flag is reset by the read command sent from DSP x to the R-terminal of flip/flop 35.

Referring next to flip/flop 45, setting and resetting of the mgi buffer empty (mgibe) flag at the mgibe terminal of DSPφ will now be explained. The mgibe flag is set by the read command provided between the rd_mgi terminal of DSPφ and the S-terminal of flip/flop 45. The mgibe flag is reset by the write command from the wr_mgo terminal of DSP x. On the same clock cycle (not shown) that data is being transferred from mgo 40 to mgi 41, flip/flop 38 provides an mgi buffer full (mgibf) interrupt to DSPφ and enables the R-terminal of flip/flop 45. As a result, the mgibe flag at the mgibe terminal of DSPφ is reset. In this manner, DSPφ is informed that its mgi register is full by the mgibf interrupt, and by resetting of its mgibe flag. When the mgibe flag is set, DSPφ is informed that its mgi register has been read.

In the embodiment shown in FIG. 3, each DSP has its own message unit, which includes a mgo register, a mgi register, a flip/flop (for example, flip/flop 45) for setting and resetting its mgibe flag, a flip/flop (for example, flip/flop 35) for setting and resetting its mgobf flag, and a flip/flop (for example, flip/flop 37) for providing the mgibf interrupt to the other DSP and enabling transfer of data to the mgi register of the other DSP.

While message unit φ has been described, it will be appreciated that any other DSP in the system has its respective message unit. For example, DSP x has message unit x. Message unit x includes mgo 40, mgi 42, flip/flop 46 (similar to flip/flop 45), flip/flop 36 (similar to flip/flop 35) and flip/flop 38 (similar to flip/flop 37).

In summary, writing data to a source DSP's mgo (for example, writing data from DSPφ to mgo 39) causes the following steps to occur:

1. The source DSP's message output buffer full (mgobf) flag is set (by flip/flop 35, for example).
2. The data is transferred to the target DSP's mgi (for example, from mgo 39 to mgi 42).
3. The target DSP's message input buffer full (mgibf) interrupt is asserted (for example, at the mgibf terminal of DSP x).
4. The target DPS's message input buffer empty (mgibe) flag is reset (for example, at the mgibe terminal of DSP x).

Reading data from the target DSP's mgi causes the following steps to occur:

1. The target DSP's message input buffer empty (mgibe) flag is set (for example, at the mgibe terminal of DSP x).
2. The source DSP's message output buffer full (mgobf) flag is reset (by flip/flop 35, for example).

The embodiments shown in FIGS. 2 and 3 may be of two types of implementations. One type includes a system using a memory-mapped register; another type includes using an off-core register.

A memory-mapped register exists at a particular address in the DSP's address space. The register receives an address on its address bus, data on its data bus and a write/read command, as shown in FIG. 2. Writing or reading to/from the register (mgi or mgo) is the same as writing or reading to/from any other memory location that DSPφ may access. The logic that performs the memory mapping (not shown) decodes the address to determine if the register is being accessed.

An off-core register is not accessible in the DSP's address space. There is dedicated hardware (not shown) in the DSP to directly access these types of registers. The registers are accessed by way of read and write strobes and compiler support that provides instructions to access the hardware. The address bus is eliminated in off-core register implementations.

Figure 4:
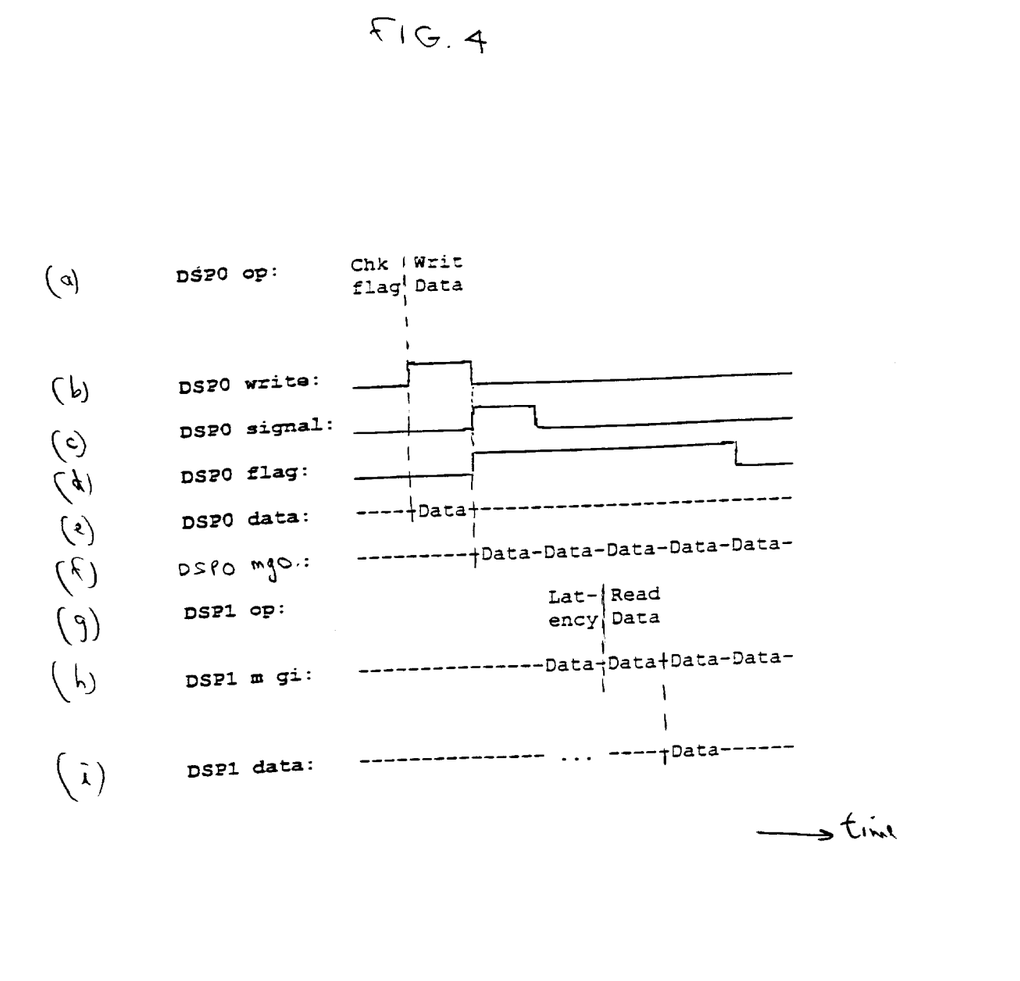
FIGS. 4(a)–4(i) are timing diagrams showing the relationship of signals as they appear at various points in the exemplary embodiment of FIG. 3.

Referring next to FIGS. 4(a)–4(i), the timing relationships of signals flowing between DSPφ and DSP1 (shown as DSP x in FIG. 3) will now be explained. FIG. 4(a) shows the operation sequence of DSPφ, namely checking that the flag (mgobf) is reset and then writing data to mgo 39. FIG. 4(b) shows the write command issued from DSPφ. FIG. 4(c) shows the signaling waveform sent by message unit φ to DSP1, namely the mgibf interrupt. Message unit φ also sets the mgobf flag, as shown in FIG. 4(d). The data from DSPφ (FIG. 4(e)) is stored in mgo register 39 (FIG. 4(f)). Two clock cycles are required to output the data onto the data bus and store the data in mgo register 39, as shown.

The data remains stored in mgo register 39, as shown in (FIG. 4(f)). The data is clocked into mgi 42 by a clocking signal (not shown) that controls the timing of DSP1 and message unit 1 (message unit x in FIG. 3).

When ready to read the data stored in mgi 42, DSP1 issues a read command (rd_mgi) to read the data. On the next clock cycle, the data is transferred to DSP1, as shown in FIGS. 4(g)–4(i).

Each message unit handles sending the data and signaling the receiving DSP. All the management of flags and interrupts are also handled by each message unit. There is no impact on any device using a shared memory, because shared memory is not required for exchanging data between DSPs.

Each message unit thus provides a means for full-duplex data exchange between DSPs without impacting the bandwidth of any shared resources. It provides an efficient means of informing a source DSP when the target DSP has accepted the data and an efficient means of signaling the target DSP when data is available from the source DSP. The source DSP may initiate a transfer solely by writing the data to his mgo and need only interrogate the mgobf flag to determine if the target DSP has received the last written data. A target DSP has the flexibility of using an interrupt service routine to handle the reading of its mgi or periodically may poll the mgibe flag to determine if it has valid data to read.

The inter-DSP exchange system described herein may be used by any one DSP to synchronize with any other DSP. It will be appreciated that if a first DSP is to exchange data with second and third DSPs, for example, the first DSP requires two message units. One message unit is required for communicating with the second DSP and another message unit is required for communicating with the third DSP. The registers in each message unit may be implemented as memory-mapped or off-core registers depending on the implementation of the DSPs. It will be appreciated that no modification needs to be made to existing DSP circuitry. The DSPs and their message units, or any other processors and their message units may be implemented on an integrated circuit (IC).

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the present invention is not limited to only the DSP described. Rather, the invention may be extended to be used by any processor or microprocessor.

What is claimed is:

1. In a multiple independent processor system having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, the second message unit storing the first data from the first message unit and responsively directly providing the first data to the second processor without further storing the first data in a memory, the first and second message units including first and second registers, respectively, for storing the first data, the first data directly loaded into the first register by the first processor, and directly read from the second register by the second processor, and control for moving the first data from the first register to the second register provided by the first processor, wherein the first data is sequentially transferred from the first processor to the second processor by (a) transferring the first data to the first message unit, (b) next transferring the same first data from the first message unit to the second message unit, and (c) next directly transferring the same first data from the second message unit to the second processor.

2. The processor system of claim 1 further including the second message unit storing second data from the second processor and transferring the stored second data to the first message unit, and the first message unit storing the second data from the second message unit and responsively providing the second data to the first processor.

3. The processor of claim 1 wherein the first message unit includes a first register for storing the first data from the first processor, and the second message unit includes a second register for receiving the first data from the first register and wherein the second register is accessible by the second processor to retrieve the first data.

4. The processor system of claim 3 wherein the second message unit includes a third register for storing the second data from the second processor, and the first message unit includes a fourth register for receiving the second data from the third register and wherein the fourth register is accessible by the first processor to retrieve the second data.

5. The processor system of claim 4 wherein the first, second, third and fourth registers are each a memory mapped register.

6. In a multiple independent processor system having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, and the second message unit storing the first data from the first message unit and responsively directly providing the first data to the second processor without further storing the first data in a memory, wherein the first data is sequentially transferred from the first processor to the second processor by (a) transferring the first data to the first message unit, (b) next transferring the same first data from the first message unit to the second message unit, and (c) next directly transferring the same first data from the second message unit to the second processor, the first message unit includes a first register for storing the first data from the first processor, and the second message unit includes a second register for receiving the first data from the first register, and the second register is directly accessible by the second processor to retrieve the first data, the second message unit includes a third register for storing the second data from the second processor, and the first message unit includes a fourth register for receiving the second data from the third register, and the fourth register is accessible by the first processor to retrieve the second data, and the first, second, third and fourth registers are each an off-core memory register.

7. The processor system of claim 4 wherein at least one of the first and second processors is a digital signal processor (DSP).

8. The processor system of claim 2 further including the first message unit providing a first interrupt signal to the second processor for informing the second processor that the first data is available for reading, and the second message unit providing a second interrupt signal to the first processor for informing the first processor that the second data is available for reading.

9. The processor system of claim 8 further including the first message unit providing a first flag signals for informing the first processor that the second processor has read the first data, and the second message unit providing a second flag signal for informing the second processor that the first processor has read the second data.

10. In a multiple independent processor system having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, the second message unit storing the first data from the first message unit and responsively directly providing the first data to the second processor without further storing the first data in a memory, the first data being sequentially transferred from the first processor to the second processor by (a) transferring the first data to the first message unit, (b) next transferring the same first data from the first message unit to the second message unit, and (c) next directly transferring the same first data from the second message unit to the second processor, the second message unit storing second data from the second processor and transferring the stored second data to the first message unit, and the first message unit storing the second data from the second message unit and responsively providing the second data to the first processor, the first message unit providing a first interrupt signal to the second processor for informing the second processor that the first data is available for reading, and the second message unit providing a second interrupt signal to the first processor for informing the first processor that the second data is available for reading, wherein each interrupt signal of the first and second interrupt signals is generated by a flip/flop enabled one clock cycle after a write command signal is provided by a respective processor to the respective message unit.

11. In a multiple independent processor system having at least first and second processors, a method for exchanging data between the first and second processors comprising the steps of:

(a) directly storing a first data word by the first processor in a first register, the first register controlled by the first processor;

(b) after storing the first data word in step (a) transferring, by the first processor, the same first data word stored in the first register to a second register, the second register controlled by the second processor;

(c) informing by an interrupt signal the second processor that the same first data word has been transferred to the second register; and (d) responsively directly transferring the same first data word in the second register to the second processor when requested by the second processor without further storing the first data in a memory.

12. The method of claim 11 further including the step of:

(e) informing the first processor by a flag signal that the second processor has requested the first data word.

13. The method of claim 11 wherein steps (a) and (b) are performed independently of the second processor.

14. The method of claim 11 wherein step (c) includes generating the interrupt signal from a write command signal provided by the first processor.

15. The method of claim 12 wherein step (e) includes generating the flag signal from a read command signal provided by the second processor.

16. The method of claim 12 further including the steps of:

(f) storing a second data word by the second processor in a third register;

(g) transferring the second data word stored in the third register to a fourth register;

(h) informing by another interrupt signal the first processor that the second data word has been transferred to the fourth register;

(i) responsively transferring the second data word in the fourth register to the first processor when requested by the first processor, and (j) informing the second processor by another flag signal that the first processor has requested the second data word.

17. The method of claim 16 wherein the first processor operates independently from the second processor and wherein the first and fourth registers are controlled by the first processor, and the second and third registers are controlled by the second processor.

18. In an integrated circuit having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, the second message unit storing the first data from the first message unit and responsively directly providing the first data to the second processor without further storing the first data in a memory, the first and second message units including first and second registers, respectively, for storing the first data, the first data directly loaded into the first register by the first processor, and directly read from the second register by the second processor, and control for moving the first data from the first register to the second register provided by the first processor, wherein the first data is sequentially transferred from the first processor to the second processor by (a) transferring the first data to the first message unit, (b) next transferring the same first data from the first message unit to the second message unit, and (c) next directly transferring the same first data from the second message unit to the second processor.

19. The integrated circuit of claim 18 further including the second message unit storing second data from the second processor and transferring the stored second data to the first message unit, and the first message unit storing the second data from the second message unit and responsively providing the second data to the first processor.

20. The integrated circuit of claim 18 wherein the first message unit includes a first register for storing the first data from the first processor, and the second message unit includes a second register for receiving the first data from the first register and wherein the second register is accessible by the second processor to retrieve the first data.

21. The integrated circuit of claim 20 wherein the second message unit includes a third register for storing the second data from the second processor, and the first message unit includes a fourth register for receiving the second data from the third register and wherein the fourth register is accessible by the first processor to retrieve the second data.

22. The integrated circuit of claim 21 wherein the first, second, third and fourth registers are each a memory mapped register.

23. In an integrated circuit having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, and the second message unit storing the first data from the first message unit and responsively directly providing the first data to the second processor without further storing the first data in a memory, wherein the first data is sequentially transferred from the first processor to the second processor by (a) transferring the first data to the first message unit, (b) next transferring the same first data from the first message unit to the second message unit, and (c) next directly transferring the same first data from the second message unit to the second processor, the first message unit includes a first register for storing the first data from the first processor, and the second message unit includes a second register for receiving the first data from the first register, and the second register is accessible by the second processor to retrieve the first data, the second message unit includes a third register for storing the second data from the second processor, and the first message unit includes a fourth register for receiving the second data from the third register, and the fourth register is accessible by the first processor to retrieve the second data, and the first, second, third and fourth registers are each an off-core memory register.

24. The integrated circuit of claim 21 wherein at least one of the first and second processors is a digital signal processor (DSP).

25. The integrated circuit of claim 21 wherein at least one of the first and second processors is a microprocessor.

26. The integrated circuit of claim 19 further including the first message unit providing a first interrupt signal to the second processor for informing the second processor that the first data is available for reading, and the second message unit providing a second interrupt signal to the first processor for informing the first processor that the second data is available for reading.

27. The integrated circuit of claim 26 further including the first message unit providing a first flag signal for informing the first processor that the second processor has read the first data, and the second message unit providing a second flag signal for informing the second processor that the first processor has read the second data.

28. In an integrated circuit having at least first and second processors, an inter-processor data exchanger comprising a first message unit and a second message unit, the first message unit coupled between the first processor and the second message unit, and the second message unit coupled to the second processor, the first message unit storing first data from the first processor and transferring the stored first data to the second message unit, and the second message unit storing the first data from the first message unit and responsively directly providing the first data to the second processor without further storing the first data in a memory, the first data being sequentially transferred from the first processor to the second processor by (a) transferring the first data to the first message unit, (b) next transferring the same first data from the first message unit to the second message unit, and (c) next directly transferring the same first data from the second message unit to the second processor, the second message unit storing second data from the second processor and transferring the stored second data to the first message unit, and the first message unit storing the second data from the second message unit and responsively providing the second data to the first processor, the first message unit providing a first interrupt signal to the second processor for informing the second processor that the first data is available for reading, and the second message unit providing a second interrupt signal to the first processor for informing the first processor that the second data is available for reading, wherein each interrupt signal of the first and second interrupt signals is generated by a flip flop enabled one clock cycle after a write command signal is provided by a respective processor to the respective message unit.

* * * * *